United States Patent [19]
Schumann et al.

[11] Patent Number: 6,006,168
[45] Date of Patent: Dec. 21, 1999

[54] THERMAL MODEL FOR CENTRAL PROCESSING UNIT

[75] Inventors: Reinhard C. Schumann, Stow; Arnold J. Smith, Ayer; Michael E. Hazen, Shrewsbury, all of Mass.

[73] Assignee: Digital Equipment Corporation, Maynard, Mass.

[21] Appl. No.: 08/990,121

[22] Filed: Dec. 12, 1997

[51] Int. Cl.[6] .................................................. G01K 17/00
[52] U.S. Cl. .......................... 702/132; 374/134; 374/137; 713/300
[58] Field of Search .................................... 702/132, 130, 702/131, 136; 395/750.01, 750.03, 750.04, 750.06; 374/10, 31, 43, 134, 137; 364/578; 713/300

[56] References Cited

U.S. PATENT DOCUMENTS

| | | | |
|---|---|---|---|
| 5,436,784 | 7/1995 | Schweitzer, III et al. | 361/25 |
| 5,600,575 | 2/1997 | Anticole | 364/557 |
| 5,604,687 | 2/1997 | Hwang et al. | 364/578 |
| 5,610,453 | 3/1997 | Smith | 307/116 |
| 5,612,604 | 3/1997 | Veijalainen et al. | 318/727 |
| 5,644,510 | 7/1997 | Weir | 364/557 |
| 5,745,375 | 4/1998 | Reinhardt et al. | 364/492 |
| 5,805,403 | 9/1998 | Chemla | 361/103 |
| 5,825,399 | 10/1998 | Orlicki et al. | 347/237 |
| 5,835,885 | 11/1998 | Lin | 702/99 |
| 5,838,590 | 11/1998 | Shimoyama et al. | 702/130 |
| 5,848,282 | 12/1998 | Kang | 395/750.05 |

OTHER PUBLICATIONS

Thomas et al., "Temperature Estimation of Semiconductor Die Heating Using Numerical Techniques in Real Time", IEE, Jan. 29, 1997.

Fitch et al., "Thermap: A Thermal Model for Microprocessors", IEEE, Sep. 1995.

Rosten et al., "Thermal Modeling of the Pentium Processor Package", IEEE, 1994.

*Primary Examiner*—Patrick Assouad
*Attorney, Agent, or Firm*—Hamilton, Brook, Smith & Reynolds, P.C.

[57] ABSTRACT

A technique for implementing a programmable thermal model of an integrated circuit component such as a central processing unit (CPU) and its associated heat sink. The model estimates the die temperature of the component as if there were no cooling devices present in the system such as a forced air cooling fan by integrating the thermal energy added when the component is active and by integrating the thermal energy removed when it is idle. A programmable power value may be used to represent the heat added to the model at each model sample period. The effect of a heat sink in cooling the idle component may be modeled by reducing the value of the heat accumulator by a predetermined fractional amount during each sample period. The decay time constant for the model may be changed by then adjusting the sample period. With an accurate model estimate predicting the component temperature in the absence of cooling being instantaneously available, any associated cooling device such as a fan can be operated in such a manner as to turn on only when it is estimated to actually be needed and to be kept off at all other times. In addition, a turn off delay can be implemented in order to avoid undesirable cycling effects.

33 Claims, 3 Drawing Sheets

THERMAL MODEL FOR CENTRAL PROCESSING UNIT

FIELD OF THE INVENTION

This invention relates generally to data processing systems and in particular to a thermal model for a heat dissipating integrated circuit component such as a central processing unit.

BACKGROUND OF THE INVENTION

Highly integrated central processing unit (CPU) components such as the microprocessors available from Digital Equipment Corporation of Maynard, Mass. and Intel Corporation of Santa Clara, Calif. enjoy increasing popularity due to their high available processing speeds, low cost, and small size. However, because of the high integration of heat generating components, personal computer (PCs) systems and workstations developed around the use of such integrated circuits (ICs) usually require the use of cooling subsystems that typically include at least one fan. The fan provides forced air cooling of the IC components in order to prevent an over-temperature situation whereby damage might otherwise occur.

One manner of designing a cooling sub-system for a personal computer is to have the cooling fan simply run all of the time that the computer system is operating. However, many users find the noise generated by the fan to be objectionable. Knowing this, together with the fact that it is often the case that the CPU component simply sits in an idle or low utilization state during prolonged periods, system designers presently include control circuits that permit the fan to be slowed or even powered down at appropriate times. A typical design approach makes use of a temperature sensitive component, such as a thermistor, to provide an electrical voltage or current proportional to the present temperature of the CPU. A fan control circuit is then arranged to be responsive to overheating conditions, such as when the measured CPU temperature exceeds a predetermined temperature, and cycles the cooling fan to an on state. When the CPU returns to a safe temperature, the control circuit then shuts the fan off.

SUMMARY OF THE INVENTION

With thermostatically controlled cooling fans, however, certain operating conditions may lead to undesirable behavior of cooling fan. These conditions may occur, for example, when the system is subjected to a particular ambient temperature or when the CPU is experiences a particular usage duty cycle. In such cases, the thermostatically controlled cooling fan may exhibit the quite objectionable behavior of turning on and then turning off periodically. Unfortunately, this cycling of the fan may be considered by some users to be even more aggravating than having the fan run continuously.

What is needed is a control scheme for forced air cooling or other manner of controlling the heat dissipated by a microprocessor central processing unit (CPU), or other integrated circuit (IC) component, which avoids a situation where the operating conditions are such that the cooling fan cycles on and off.

Briefly, the present invention solves this problem by using a fan controller that operates the cooling fan only when a heat modeling circuit predicts that the operating conditions of the component, such as ambient temperature or duty cycle, indicate that the fan will need to be activated. Therefore, rather than simply measure the actual temperature of the component, the controller maintains a programmable thermal model of the component, and any associated heat sink, to estimate the component die temperature as if the cooling fan were never activated. The model provides this continuous estimate by adding a heat value to the model when the component is active in an amount equal to an observed or expected component heating profile, and by removing a heat value from the model in an amount equal to an observed cooling of the component when it is inactive. In this manner, the model can predict whether the fan will need to be turned on, assuming that the component continues to operate.

The thermal model is preferably implemented with registers, arithmetic circuits, control logic and/or with a programmable microcontroller, so that parameters for the thermal model may be changed under program control if desired.

In the preferred embodiment, the programmable thermal model uses a set of registers including a model fan accumulator register, a model fan control register, and a fan threshold register. The fan accumulator register is used by the thermal model to maintain a value indicative of current component temperature expressed as a value above the ambient temperature. The fan control register contains a number of constants parameters for the fan model. The threshold register maintains a set of thresholds for controlling the operating states of the fan.

During operation, heat loss proportional to the components temperature rise above ambient as provided, for example, by a heat sink in which the component is mounted, is modeled by periodically multiplying the contents of the fan accumulator register by a fractional constant. This constant multiplication is applied each time a model sample period occurs. In the absence of added heat, this causes the modeled temperature to decay to an ambient temperature over time. The fractional constant can be chosen somewhat arbitrarily, so a constant such as 255/256 is typically preferred so that a simplified multiplier can be used.

The model sampling period is also programmable and therefore may be changed to set the rate of heat loss. For example, the shorter the sample period, the quicker the model will dissipate heat.

An "on heat" value represents the amount of heat generated by the component while it is operating in the on state. The on heat value is added to the fan accumulator register for every sample period during which the component is in an active state.

In the steady state, the thermal model thus adds heat as modulated by the duty cycle of the component and subtracts heat proportional to a decay cooling model of the component and heat sink, to provide an estimate of what the temperature of the component would be if the fan were never activated. In this manner it can be predicted whether or not an over-temperature state will be reached without the need to turn the fan on. If the model predicts that the over-temperature state will be reached, the fan is activated; if not, the fan is kept off.

Therefore, in connection with another aspect of the invention, the contents of the fan accumulator register can be compared to values stored in the fan threshold register to trigger various states of the fan itself. Preferably, the fan is provided with a low speed and high speed setting. In this case, separate threshold values can be provided for the fan on low, fan on high, fan high to low, and fan off conditions.

Once the fan is on, a fan timer can be used to insure that the fan always stays on for a minimum period of time, as determined by a fan off delay parameter also stored in the fan control register.

One possible method for initially setting the thermal model constant parameters is as follows. First, a steady state temperature rise of the component is measured at full operating speed with the fan off. This maximum temperature, Tmax, is then stored as the on heat value. A heat sink time constant, Ths, is then determined by measuring the time necessary for the component temperature to drop to a predetermined percentage, such as 37%, of the Tmax value after power is removed from the component. This time measurement is also taken with the fan off.

Next, the model sample period can be set proportionally to the heat sink time constant, Ths, so that the decay curve of the decay model approximates the temperature decay curve of the heat sink. The fan on, fan on high, fan high to low, and fan off parameters are then set according to desired actual maximum temperature rise and/or desired duty cycles preferred for the high speed and low speed fan settings. The fan off delay is then also set in connection with the cycle time of the processor. This is preferably in a range of from 600 to 900 seconds to minimize fan cycling.

A control circuit according to the invention may also be of some assistance in a notebook computer or other system even where there is no fan. In such an instance there may be a need to limit the amount of power consumed and/or heat generated by a component. For example, the same thermal model may be used whereby the "fan" control signals are instead routed to a supervisory interrupt or other circuit which then causes the component to operate at a slower clock frequency or duty cycle, or even lower operating voltage, to limit heat and power dissipation when the heat thresholds are exceeded.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF PREFERRED EMBODIMENTS

Figure 1:
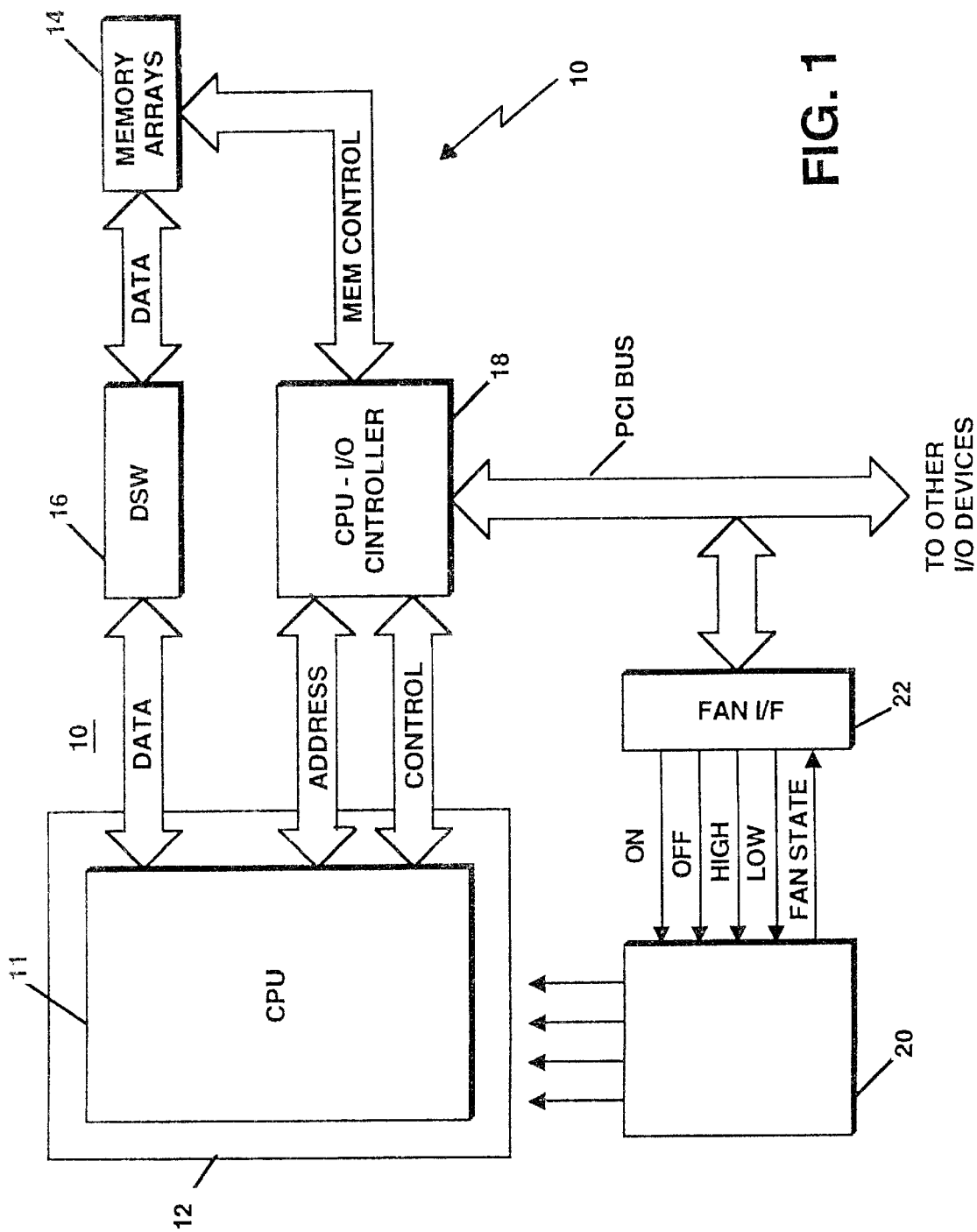
FIG. 1 is a block diagram of a data processing system making use of a controller that implements a thermal model according to the invention.

Turning attention now to FIG. 1 more particularly, there is shown a data processing system 10 in which a thermal model according to the invention may be advantageously used to control a fan or other mechanism for reducing the operating temperature of an integrated circuit (IC) component such as a microprocessor. In the illustrated system 10, there is a central processing unit (CPU) 11 implemented on such an integrated circuit (IC). The CPU 11 may, for example, be one of the Alpha series microprocessors available from Digital Equipment Corporation of Maynard, Mass.

The CPU 11, typically mounted in a heat sink 12, is arranged to communicate with other data processing system components such as memory arrays 14, data bus switch 16, CPU controller 18, fan 20, and fan interface 22, and peripheral input/output devices such as disk drives and displays (not shown). The operation of the system 10 for executing data processing commands is typical in that address and control signals are exchanged between the CPU 11 and memory 14 operations such as reading or writing data from or to the memory arrays 14, and/or reading or writing data from or to other peripheral devices such as disk drives and displays for example, through a Peripheral Component Interconnect (PCI) bus.

One such peripheral from the viewpoint of the CPU controller 18 may be the fan 20. In particular, the state of the fan 20 may be controlled through the fan interface 22 which provides control signals such as power on, power off, high speed, and low speed settings. In addition, logic signals indicating the present state of the fan 20 may also be provided through the fan interface 22 back to the controller 18.

It should be understood that the CPU controller 18 typically provides a number of other functions beyond those associated with controlling the fan 20 such as power on and power off sequencing of the CPU 11, operation of the data switch 16 circuits to allow the CPU 11 to either access the memory 14 or PCI bus. In the context of the Alpha series microprocessors from Digital Equipment Corporation, the CPU controller 18 is sometimes referred to as a "core logic chip".

Figure 2:
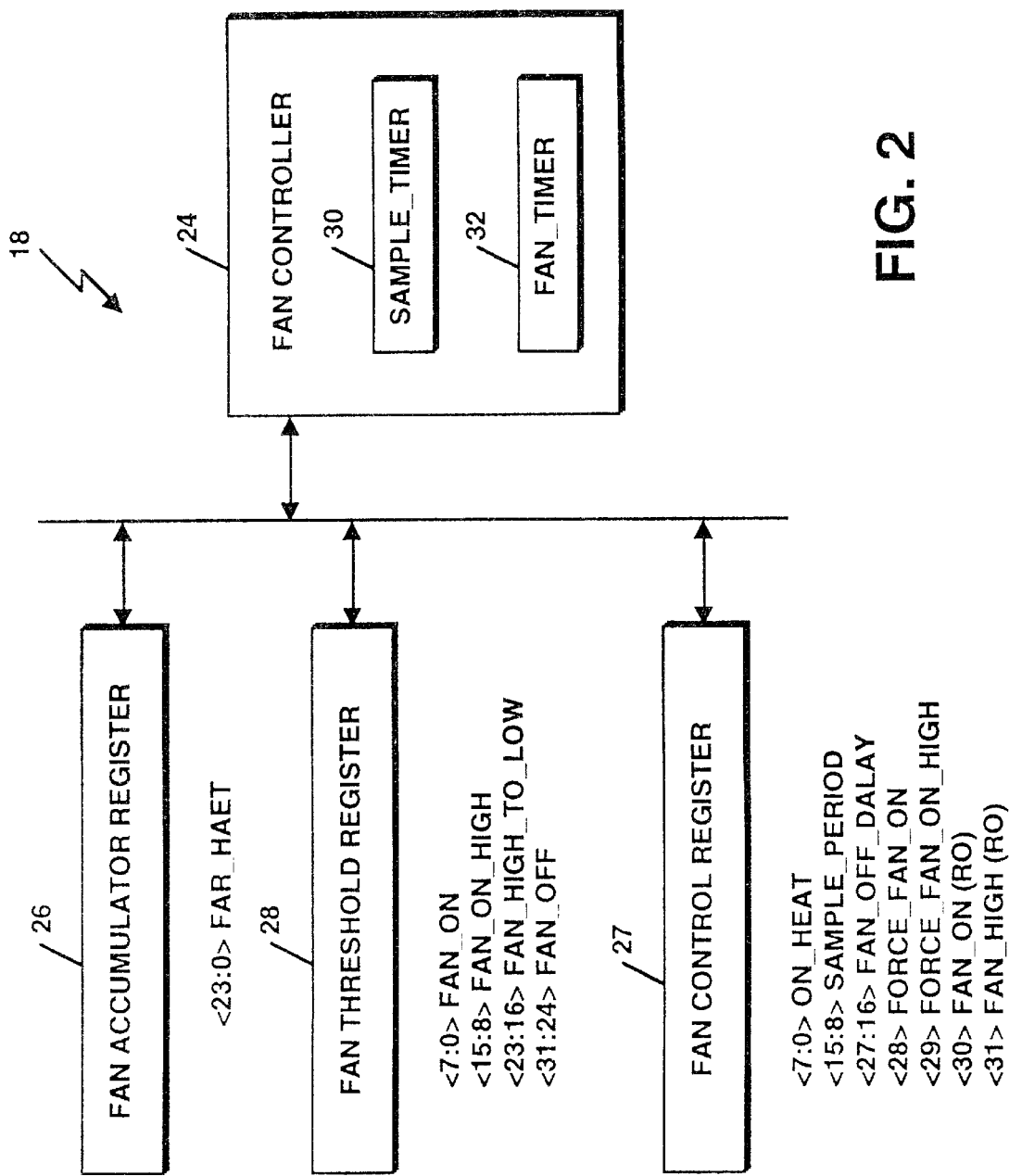
FIG. 2 is a more detailed view of the controller showing the various registers and timers used by the thermal model.

Turning attention now to FIG. 2, certain parts and/or functions of the CPU controller 18, particularly those responsible for controlling the state of the fan 20, will now be described in greater detail. The CPU controller 18 includes a functionality referred to as the fan controller 24. The fan controller 24 is responsible for maintaining a thermal model of the CPU 11 and heat sink 12 in order to determine whether the fan 20 should be turned on, turned off, or set to a high or low operating speed. The fan controller 24 may be implemented in any number of ways, including as hard wired logic and registers, programmable logic arrays, or as a firmware programmable microcontroller.

In general, the thermal model of the CPU 11 and heat sink 12 continuously estimates what the die temperature of the CPU 11 would be in the absence of any external cooling fan 20. This is accomplished by integrating data values indicative of the thermal energy heat added to the CPU 11 during times when the CPU is operating. The model also integrates the thermal energy removed from the CPU 11 by the heat sink 12 during such times that the CPU 11 is idle.

In the preferred embodiment, the model is implemented using an accumulator register. The thermal energy added during an operating cycle is then modeled by simply adding an "on heat" value to the register for each model sample period when the CPU 11 is active. The cooling effect of the CPU 11 and its heat sink is modeled as an exponential decay, and therefore is implemented by multiplying the value of the accumulator by a fractional constant during each model sample period.

The fan controller 24 makes use of a number of storage registers for maintaining information necessary to implement this thermal model, as well as to control the operating state of the fan 20. These include, in the preferred embodiment, a fan accumulator register 26, a fan threshold register 27, and fan control register 28. In addition, the fan controller 24 uses a model sample timer 30 and fan timer 32 that are programmable event timers.

The fan accumulator register (FAR) 26 contains a data value, referred to herein as the component heat value, FAR_HEAT. The FAR_HEAT value is used by the model as an estimate of the instantaneous temperature of the CPU 11 expressed as a value in degrees above the ambient temperature without the fan 20. The FAR_HEAT value is therefore not intended as an estimate of the actual temperature of the CPU 11, but rather a prediction of what its temperature would be if the fan 20 was not present at all in the system 10. In the illustrated embodiment, the FAR_HEAT value is expressed as a 24 bit value, i.e., it occupies bits <23:0> of the fan accumulator register 26.

The fan control register (FCR) 27 contains a number of fields each containing other data values used by the thermal model. A first one of these fields, ON_HEAT, at FCR bits <7:0>, is a value equivalent to the amount of heat added to the model during each of a model update sample period. The SAMPLE_PERIOD, at FCR bits <15:8>, is a value indicating the duration of the model update sample period, expressed typically as a multiple of a number of clock cycles of the CPU 11. The FAN_OFF_DELAY, FCR bits <27:16>, indicate a delay in sample periods or clock cycles for which the fan 20 is guaranteed to remain on. FCR bits <28> and <29> allow the fan controller 24 to force the fan 20 to the on state or to the high speed state, respectively. FCR bits <30> and <31> reflect the current state of the fan 20 as read through the fan interface 22, there being bits for fan on at FCR bit <30> and fan high at FCR bit <31>, respectively. These are considered to be read only bits during the operation of the thermal model portion of the fan controller 24.

The fan threshold register (FTR) 28 contains fields indicating thresholds at which the fan operating state is desired to be changed. The FAN_ON field, FTR bits <7:0>, indicate a value for the fan accumulator register 26 above which the fan 20 should be turned on. A FAN_ON_HIGH field, FTR bits <15:8>, indicates when the fan should be turned to the high speed state. A FAN_HIGH_TO_LOW field, FTR bits <23:16>, indicates a temperature at which the fan should be changed from the high to the low speed state. Finally, a FAN_OFF field, FTR bits <31:24>, indicates when the fan 20 should be turned off.

Figure 3:
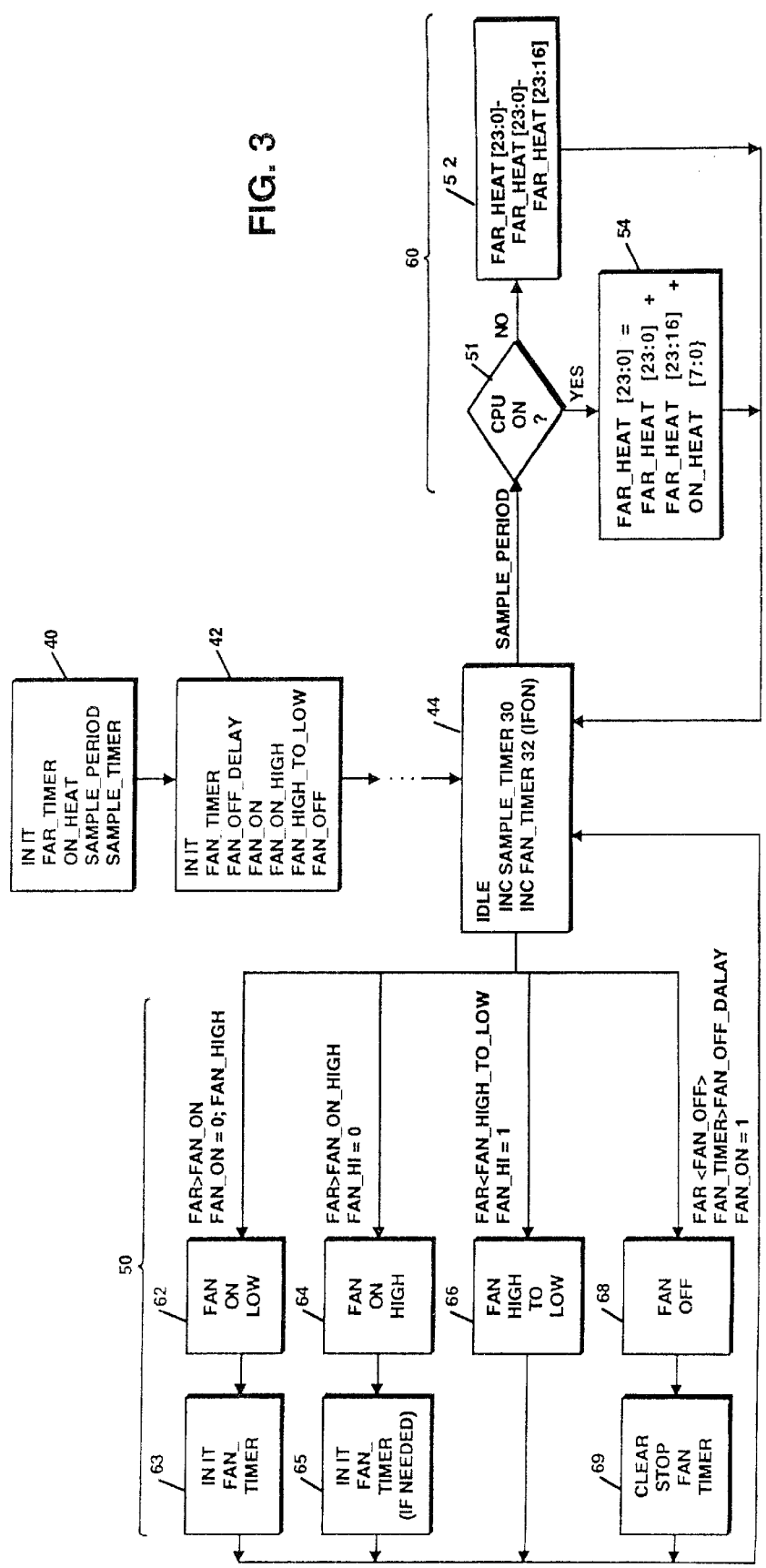
FIG. 3 is a more detailed state diagram of a process performed by the controller in order to maintain the thermal model, as well as to control the operating speed of a fan or other heat reducing control.

A flow diagram indicating the logical operations in the case of a hardware implementation of the fan controller 24, or a sequence of program steps performed in the case of a programmable microcontroller implementation, are shown in FIG. 3.

In a first state 40, parameters associated with the thermal model such as FAR_HEAT, ON_HEAT, and SAMPLE_PERIOD are initialized. These values can be set from previously observed operating characteristics. For example, the FAR_HEAT value can assumed to be a maximum temperature, Tmax, observed when the fan 20 is not operating in the system 10. The time constant for the model sampling, SAMPLE_PERIOD, is then set to a value which is proportional to the observed time for the drop from this maximum temperature Tmax to a predetermined fractional value, such as to 37%, of its maximum steady state value after power is removed from the CPU 11. This measurement is also preferably taken with the fan 20 in the off position. The SAMPLE_PERIOD value is expresses typically in terms of a multiple number of mater system clock cycles, so that the thermal model is updated only at a rate which is necessary. The SAMPLE_PERIOD value is typically loaded into the sample period timer 30 at this time in order to initialize it as well.

The FAR_HEAT value, being references to ambient temperature, is typically initialized to zero. It should be understood that the determination of the ON_HEAT and SAMPLE_PERIOD values is typically done once at the factory and therefore these steps 40 simply require the loading of constant values during normal operation of the system 10.

A next state 42 initializes values required for controlling the operation of the fan 20 in response to the thermal model. In particular, these include initialization of the FAN_OFF_DELAY parameter, which is set depending upon desired turn off delay for the fan 20. This may be set, for example, in a range of from 600 to 900 seconds.

The FAN_ON value is initialized to the desired temperature rise over ambient at which the fan 20 should be turned on. Alternatively, this can be set to a value depending upon the desired on duty cycle for the fan 20. For example, it may be set to an amount equal to the "on" duty cycle multiplied by the maximum temperature, Tmax.

The FAN_ON_HIGH, FAN_HIGH_TO_LOW, and FAN_OFF values are similarly set to desired points at which the fan 20 should be set to the high speed position, from the high speed position to the low speed position, and/or turned off, respectively. These values may be set according to desired temperature ranges or duty cycles for the respective settings for the fan. If the FAN_HIGH_TO_LOW value is set to be a value smaller than FAN_ON_HIGH, then the cycling from low speed to high and then back again to low speed will exhibit some hysteresis. The difference between the FAN_ON_HIGH and FAN_HIGH_TO_LOW settings can therefore be used to control how long the fan will remain in any given speed state as well.

The fan timer 32 is initialized to an off state.

After performing other functions which may be associated with other parts of the system 10, the fan controller 24 reaches an idle state 44. In this idle state 44, the sample timer 30 is continuously incremented such as in accordance with the elapse of a given number of master system clock cycles. In addition, if the fan timer 32 has been activated, it is also incremented.

From state 44, a number of states 50 are executed from time to time in order to maintain the appropriate thermal model for the CPU 11. In particular, upon the occurrence of each sample period event, as set by the SAMPLE_PERIOD value, such as the expiration of the predetermined amount of time, a state 51 is entered in which it is determined whether or not the CPU 11 is in the on state. If this is not the case, then the next state 52 is entered. In this state, the CPU 11 is off and therefore no heat is being added to the thermal model. However, heat is being removed from the model by the heat sink 12. In this state 52, the value in the fan accumulator register 26 is reduced by an amount equal to a predetermined decay constant. In the illustrated preferred embodiment, this constant is equal to 255 divided by 256. The multiplication by this fraction is thus implemented with a simple shift and subtraction, as shown. However, it should be understood that other constants and more complicated incremental downward adjustments of the value in the FAR_HEAT field can be implemented. From state 52, processing then returns to the idle state 44.

If instead, in state 51, the CPU 11 is in the on state, then state 54 is entered in which the thermal model is updated for the heat dissipating case. In this state, the value in the fan accumulator register 26 is increased by adding the ON_HEAT value. In addition the heat dissipation by the heat sink 12 is accounted for by also accumulating a fraction of the current value of FAR_HEAT. After updating the contents of the fan accumulator register 26, the idle state 44 is then returned to.

The controller 24 also periodically performs a number of operations in order to control the fan speed 20 based upon the results of the thermal model states 50. These fan control operations 60, generally shown at the left hand side of FIG. 3, include comparing the contents of the fan accumulator register 26 against the previously described threshold values. When these thresholds are crossed, the fan 20 is set to the appropriate speed or on or off state and the setting of the fan timer 32 is adjusted as needed.

More particularly, a first state 62 is reached when the contents of the fan accumulator register 26 exceed the FAN_ON value (as stored in in the fan threshold register 28), while at the same time with the fan 20 being in the off state, as indicated by the FAN_ON and FAN_HIGH bits both being set to logic value zero. In this state 62, a command is issued to the fan 20 over the interface 22 to set the fan 20 to the low speed setting.

In the next following state 63, the fan timer 32 is initialized. Processing then returns to the idle state 44.

If the value of the contents of the fan accumulator register 26 exceeds the FAN_ON_HIGH value, then state 64 is entered in which the fan 20 is switched to the high speed position. In the next state 65, the fan timer 32 is initialized as needed. Processing then returns to the idle state 44.

In the next scenario, the contents of the fan accumulator register 26 are less than the FAN_HIGH_TO_LOW value, and the FAN_HIGH is set to true indicating that the fan 20 is presently on high speed, and that the low speed threshold has now been crossed. In this state 66, the fan has switched from the high speed to the low speed. Processing returns to the idle state 44, and the fan timer 32 state is not modified in this instance.

Finally, a state 68 is entered when the contents of the fan accumulator register 26 are less than or equal to the FAN_OFF value, the fan state indicates that the fan is on, and the fan timer 32 has been running for an amount longer than the desired delay as indicated by the FAN_OFF_DELAY value. In this instance, state 68 causes the fan 20 to be turned to the off state and in state 69, the fan timer 32 is cleared and stopped.

It should be understood that the fan controller 24 may also be used to control other signals or devices that may affect the operating temperature of the CPU 11. For example, in a notebook computer, there may be no fan 20. However, there may be a need to limit the amount of heat and/or power consumed by the CPU 11 nonetheless, and the fan controller 24 can be of some assistance in this situation. For example, the fan control signals can be routed to a supervisory micro controller or in other ways such as to a CPU 11 interrupt in which the system 10 is reset to operate at a slower operating frequency and/or lower voltage. This can limit the power dissipation and hence reduce the operating temperature of the CPU in cases even where there is no fan 20.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for controlling an operating temperature of an electronic component comprising the steps of:
    a) developing a thermal model of the component to estimate its temperature in the absence of external heat control by:
        i) estimating heat added to the component while the component is in a heat generating state, and accounting in the thermodynamic model for such heat added;
        ii) estimating heat dissipated from the component while the component is in a heat dissipating state, and accounting in the thermodynamic model for such heat dissipated;
    wherein step a) of developing a thermal model of the component additionally comprises the steps of:
        iii) storing a present temperature estimate value;
        iv) adding a unit heat value to the present temperature estimate value when the component is in the heat generating state, where the unit heat value is selected based on the current operating state; and
        v) reducing the temperature estimate value when the component is in the heat dissipating state in a predetermined manner; and
    b) altering a state of an external heat control characteristic of the component in response to changes in the state of the thermal model.

2. A method as in claim 1 wherein the step of adding the unit heat value adds the unit heat value to the present temperature estimate value at each of a series of model update sample periods.

3. A method as in claim 1 wherein the step of reducing the temperature estimate value reduces the temperature estimate value by a predetermined proportion at each of a series of model update sample periods.

4. A method as in claim 1 wherein the model update cycle time is adjusted according to a cooling capacity of the heat control characteristic.

5. A method as in claim 1 wherein the heat generating state is one where a clock cycle rate of the component is relatively high.

6. A method as in claim 1 wherein the heat dissipating state is one where a clock cycle rate of the component is relatively low.

7. A method as in claim 1 wherein the heat generating state is a state when the component is operating and the heat dissipating state is a state when the component is idle.

8. A method as in claim 1 wherein step b) of altering a heat control characteristic of the component additionally comprises the step of:
    controlling an on and off state of a forced air cooling fan arranged to cool the component.

9. A method as in claim 1 wherein step b) of altering a heat control characteristic of the component additionally comprises the step of:
    controlling an operating speed of a forced air cooling fan arranged to cool the component.

10. A method as in claim 8 additionally comprising the step of:
    comparing a present temperature estimate value to a fan on threshold to determine when to turn the fan on.

11. A method as in claim 8 additionally comprising the step of:
    comparing a present temperature estimate value to a fan off threshold to determine when to turn the fan off.

12. A method as in claim 11 additionally comprising the step of:

preventing the fan from turning off until a minimum fan on time has elapsed with the fan in the on state.

13. A method as in claim 9 additionally comprising the step of:
comparing a present temperature estimate value to a fan high speed threshold to determine when to set the fan to a high speed state.

14. A method as in claim 9 additionally comprising the step of:
comparing a present temperature estimate value to a fan low speed threshold to determine when to set the fan to a low speed state.

15. A method as in claim 14 additionally comprising the step of:
preventing the fan from entering the low speed state until a minimum fan on time has elapsed with the fan in the high speed state.

16. A method for controlling the temperature of central processing unit (CPU)integrated circuit component in a data processing system comprising the steps of:
 a) setting an accumulator register to an initial value indicative of a steady state ambient operating temperature of the CPU;
 b) selecting a model update sample period;
 c) selecting an on heat value representative of the heat generated by the CPU during a sample period when the CPU is in an active state;
 d) selecting a cooling value representative of the heat dissipated by the CPU when the CPU is in an inactive state;
 e) for each sample period,
  i) if the CPU is in an active state, adding the on heat value to the accumulator register;
  ii) reducing the value of the accumulator register by an amount proportional to the cooling value;
 f) comparing the value of the contents of the accumulator register to a predetermined fan on threshold to control the operation of a cooling fan, and if the accumulator value exceeds the fan on threshold, turning the fan on; and
 g) comparing the value of the contents of the accumulator register to a predetermined fan off threshold to control the operation of the cooling fan, and if the accumulator value is less than the fan off threshold, turning the fan off.

17. For use in a data processing system, an apparatus for controlling a cooling fan arranged to reduce the operating temperature of an integrated circuit component by modeling the thermal behavior of the component, the apparatus comprising:
a fan accumulator register for storing a data value representative of a temperature of the component in the absence of the cooling fan;
a thermal model integrator
 for increasing a value of the contents of the fan accumulator register for model sample periods in which the component is in an active state; and
 for reducing the value of the contents of the fan accumulator register for each model sample period; and
a fan state controller, for controlling an operating state of the cooling fan in response to changes in the contents of the fan accumulator register.

18. An apparatus as in claim 17 wherein the thermal model integrator increases the value of the fan accumulator register by an observed power on heat amount.

19. An apparatus as in claim 17 wherein the thermal model integrator decreases the value of the fan accumulator register according to an exponential decay.

20. An apparatus as in claim 19 wherein the thermal model integrator decreases the value of the fan accumulator register by multiplying the contents by a predetermining fractional ratio representative of an observed cooling capacity of the component and any heat sink in which the component is mounted.

21. An apparatus as in claim 17 wherein the sample period may be programmed.

22. An apparatus as in claim 17 wherein the fan state controller turns the cooling fan on when the value of the fan accumulator register exceeds a predetermined fan on threshold.

23. An apparatus as in claim 17 wherein the fan state controller turns the cooling fan off when the value of the fan accumulator register is less than a predetermined fan off threshold and the cooling fan has been operating for at least a minimum fan on time.

24. An apparatus as in claim 17 wherein the fan state controller changes the operating speed of the fan when the value of the fan accumulator register crosses a fan speed threshold.

25. An apparatus for controlling the temperature of central processing unit (CPU) integrated circuit component in a data processing system comprising:
 a) means for setting an accumulator register to an initial value indicative of a steady state ambient operating temperature of the CPU;
 b) means for selecting a model update sample period;
 c) means for selecting an on heat value representative of the heat generated by the CPU during a sample period when the CPU is in an active state;
 d) means for selecting a cooling value representative of the heat dissipated by the CPU when the CPU is in an inactive state;
 e) means for, during each sample period,
  i) if the CPU is in an active state, adding the on heat value to the accumulator register; and
  ii) reducing the value of the accumulator register by an amount proportional to the cooling value;
 f) means for comparing the value of the contents of the accumulator register to a predetermined fan on threshold to control the operation of a cooling fan, and if the accumulator value exceeds the fan on threshold, turning the fan on; and
 g) means for comparing the value of the contents of the accumulator register to a predetermined fan off threshold to control the operation of the cooling fan, and if the accumulator value is less than the fan off threshold, turning the fan off.

26. A data processing system implemented using integrated circuit components, wherein the data processing system comprises:
a central processing unit, for executing a program and generating address and data signals in response thereto;
a peripheral input/output controller, for reading and writing data to be used in executing the program to and from a peripheral input/output device;
a data bus, connected between the central processing unit and the peripheral input/output controller, for coupling address and data signals between the central processing unit and peripheral input/output controller;
a cooling fan, arranged to reduce an operating temperature of at least one integrated circuit component of the data processing system by modeling the thermal behavior of the component;

a fan accumulator register, for storing a data value representative of a temperature of the component in the absence of the cooling fan;

for increasing a value of the contents of the fan accumulator register for model sample periods in which the component is in an active state; and for reducing the value of the contents of the fan accumulator register for each model sample period; and a fan state controller, for controlling an operating state of the cooling fan in response to changes in the contents of the fan accumulator register.

27. An apparatus as in claim 26 wherein the thermal model integrator increases the value of the fan accumulator register by an observed power on heat amount.

28. An apparatus as in claim 26 wherein the thermal model integrator decreases the value of the fan accumulator register according to an exponential decay.

29. An apparatus as in claim 28 wherein the thermal model integrator decreases the value of the fan accumulator register by multiplying the contents by a predetermining fractional ratio representative of an observed cooling capacity of the component and any heat sink in which the component is mounted.

30. An apparatus as in claim 26 wherein the sample period may be programmed.

31. An apparatus as in claim 26 wherein the fan state controller turns the cooling fan on when the value of the fan accumulator register exceeds a predetermined fan on threshold.

32. An apparatus as in claim 26 wherein the fan state controller turns the cooling fan off when the value of the fan accumulator register is less than a predetermined fan off threshold and the cooling fan has been operating for at least a minimum fan on time.

33. An apparatus as in claim 26 wherein the fan state controller changes the operating speed of the fan when the value of the fan accumulator register crosses a fan speed threshold.

* * * * *